United States Patent [19]

Fujii

[11] Patent Number: 5,666,471
[45] Date of Patent: Sep. 9, 1997

[54] IMAGE PROCESSING APPARATUS FOR DIVIDING IMAGES FOR PRINTING

[75] Inventor: Norihisa Fujii, Tokoname, Japan

[73] Assignee: Brother Kogyo Kabushiki Kaisha, Nagoya, Japan

[21] Appl. No.: 3,016

[22] Filed: Jan. 11, 1993

[30] Foreign Application Priority Data

Jan. 22, 1992 [JP] Japan .................................. 4-009509

[51] Int. Cl.$^6$ ...................................................... H04N 1/40
[52] U.S. Cl. .......................................... 395/117; 345/435
[58] Field of Search ...................................... 395/111, 117,
395/146, 155, 100, 101, 106, 135, 136;
358/75, 400, 409, 443, 462, 470, 451, 500,
453; 382/175, 176, 178; 345/121, 127

[56] References Cited

U.S. PATENT DOCUMENTS

| | | | |
|---|---|---|---|
| 4,617,596 | 10/1986 | Yoshida et al. | 358/280 |
| 4,733,304 | 3/1988 | Homma et al. | 358/453 |
| 4,791,486 | 12/1988 | Spriggs et al. | 358/138 |
| 4,905,095 | 2/1990 | Yamada . | |
| 4,907,095 | 3/1990 | Komura et al. | 358/451 |
| 4,920,502 | 4/1990 | Yamada | 364/518 |
| 4,939,673 | 7/1990 | Hanau et al. | 364/521 |
| 4,947,269 | 8/1990 | Yamada | 358/448 |
| 5,001,574 | 3/1991 | Shimizu et al. | 358/448 |
| 5,018,023 | 5/1991 | Kubota | 358/450 |
| 5,086,434 | 2/1992 | Abe et al. | 375/7 |
| 5,129,011 | 7/1992 | Nishikawa et al. | 382/9 |
| 5,162,918 | 11/1992 | Muramatsu | 358/200 |
| 5,347,624 | 9/1994 | Takahashi et al. | 395/157 |

*Primary Examiner*—Joseph Mancuso
*Assistant Examiner*—Gabriel I. Garcia
*Attorney, Agent, or Firm*—Oliff & Berridge

[57] ABSTRACT

In an image processing apparatus comprising an image reading device, a control unit, a display unit and a print device, the entire image data read by the image reading device is displayed on the display unit. The periphery of the image data is arbitrarily trimmed on the display unit by operating a mouse controlled by the control unit. Next, the dividing position of the trimmed image is arbitrarily selected by operating the mouse controlled by the control unit so that the dividing position should not pass through an important part of the image. Each portion of the divided image data is printed out by the print device, and then all divided images are manually adhered by the operator. Therefore, a maximum size of the print image can be obtained, even when the size exceeds the possible print size of the print device.

12 Claims, 7 Drawing Sheets

IMAGE PROCESSING APPARATUS FOR DIVIDING IMAGES FOR PRINTING

BACKGROUND OF THE INVENTION

1. Field of the Invention

The present invention relates to an image processing apparatus which edits and prints image data, and, more particularly to an image processing apparatus which trims or divides image data and prints out trimmed or divided image data.

2. Description of Related Art

A conventional image processing apparatus has an image reading device such as an image scanner, a display such as a CRT which displays image data based on image information read by the image reading device, and an input device such as a keyboard or a mouse. Moreover, the conventional image processing apparatus has a function for creating image data based on the image information read by the image reading device and for editing such image data. Further, the conventional image processing apparatus has a function for trimming a part of the image data, or for magnifying or reducing the image data, and then printing the image by a print device. In addition, the conventional image processing apparatus has a function for automatically dividing the image data corresponding to the possible print size, and for printing the divided image data when the print device cannot output the entire image at one time. Such an apparatus is disclosed in U.S. Pat. No. 4,905,095 (Japanese Patent Laid-Open No. 62-30236).

In the conventional image processing apparatus, the image data is automatically divided corresponding to the possible print size. Therefore, the dividing line in the image data which will be adhered after print out may pass through an important part of the image data (for instance, face of a person etc.) when the image data is divided and printed out which causes an unsatisfactory result. Moreover, another problem in the prior art is that the conventional image processing apparatus may print an unnecessary part of the image data because the trimming area cannot be freely set with respect to the dividing line.

SUMMARY OF THE INVENTION

An object of the present invention is to provide an image processing apparatus which can freely set the dividing position of image data in consideration of the position where each part of the divided image data is adhered after being printed, and which can execute a division print operation efficiently.

In order to attain the above and other objects, an image processing apparatus according to the present invention comprises image reading means for providing image data which can be trimmed or divided, trimming area designating means for designating a trimming area where the periphery of the image data provided by the image reading means is trimmed and for freely selecting two points on the image data, dividing position designating means for designating a dividing position which divides the image data into plural parts and for arbitrarily selecting two points in the designated trimming area, calculating means for calculating coordinates of a plurality of points designated by the trimming area designating means and the dividing position designating means, display means having a display unit for simultaneously displaying the image data, the trimming area, and the dividing position, printing means for printing image data divided based on the designated trimming area and dividing position, and expansion rate calculating means for automatically calculating a maximum expansion rate for printing the divided image data within the possible print size of the printing means.

In the image processing apparatus of the present invention thus constructed, the entire image data read by the image reading device is displayed on the display means. The periphery of the image is trimmed by operating a trimming area designating means such as a mouse on the image data displayed on the display means. Next, the dividing position of the trimmed image is selected by operating a dividing position designating means so that a dividing line does not pass through an important part of the image. Each divided image data is printed out by the print device.

As explained above, in the image processing apparatus of the present invention, a dividing position for the entire image data or for an arbitrarily trimmed area can be set so that the divided area does not pass through an important part of the image and, as a result, a beautiful print image can be obtained whose size exceeds the possible print size of the print device.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

Referring now to the accompanying drawings, preferred embodiments of the present invention will be described in detail.

Figure 1:
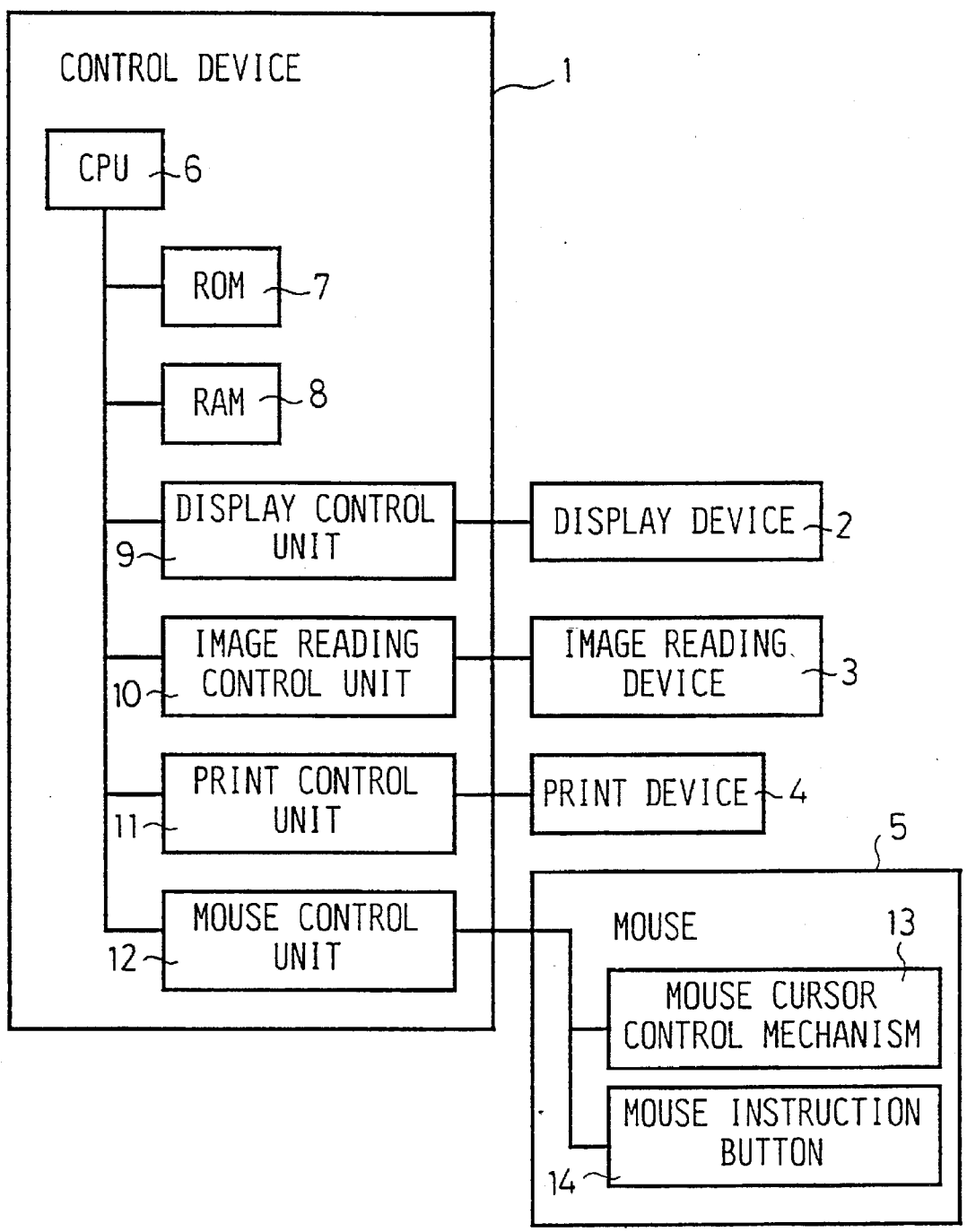
FIG. 1 is a block diagram schematically showing the construction of an image processing apparatus in accordance with the present invention.

As shown in FIG. 1, an image processing apparatus comprises a control device 1 which controls the entire image processing apparatus, a display device 2 such as a CRT, an image reading device 3 such as an image scanner, a print device 4 such as a printer which prints out an image read by the image reading device 3, and a mouse 5 which instructs the setting of a dividing position and a trimming position on displayed image data.

The control device I includes a CPU 6, a ROM 7 which memorizes a control program of the CPU 6, a RAM 8 which memorizes image data, a trimming area, and a dividing position, a display control unit 9 which controls the display device 2, an image reading control unit 10 which controls the image reading device 3, a print control unit 11 which controls the print device 4, and a mouse control unit 12 which controls the mouse 5. The mouse 5 includes a mouse cursor control mechanism 13 for controlling a mouse cursor, and a mouse instruction button 14 for inputting positional information of the mouse cursor to the control device 1.

Figure 2:
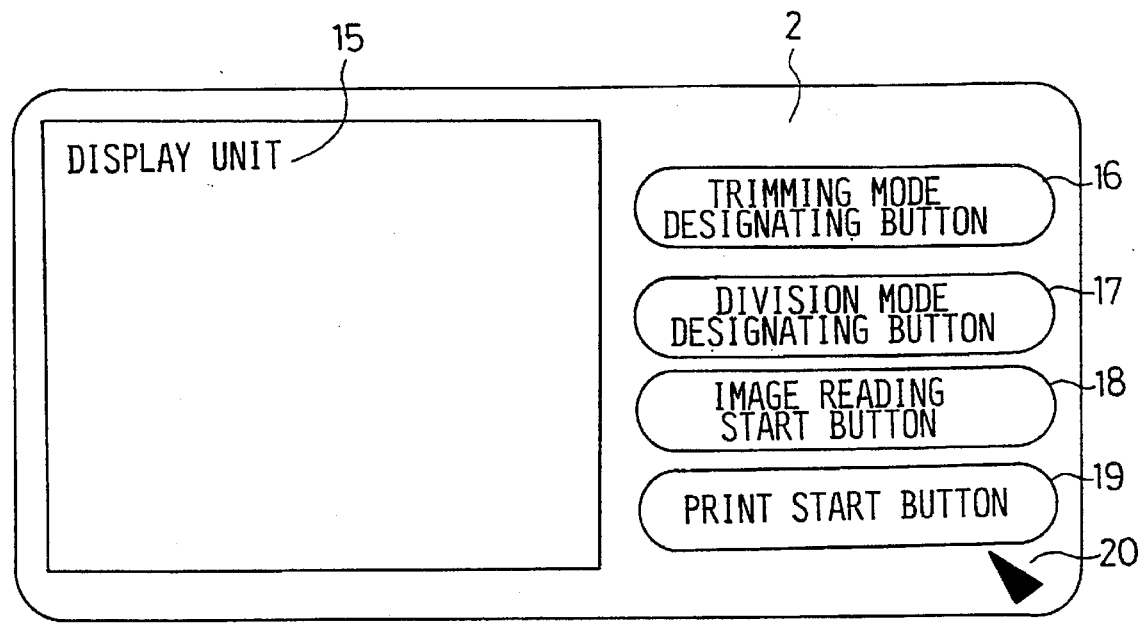
FIG. 2 is a schematic front view showing the display construction of a display device.

As shown in FIG. 2, the display device 2 includes a display unit 15, a trimming mode designating button 16, a division mode designating button 17, an image data reading start button 18, a print start button 19 and a mouse cursor 20. The display unit 15 simultaneously displays image data, a trimmed area where the periphery of the image data is trimmed, and a dividing line for dividing the image data. The trimming mode designating button 16 designates a mode for setting a trimmed area of the image data. The division mode designating button 17 designates a mode for setting a dividing position of the image data. The image data reading start button 18 starts reading of the image data. The print start button 19 starts printing of the image data. The mouse cursor 20 has a shape such as an arrow.

An operation to the mouse cursor control mechanism 13, created by operating the mouse 5, is transmitted to the CPU 6 through the mouse control unit 12, and the CPU 6 puts out an instruction based on the operation to the display control unit 9. Therefore, the mouse cursor 20 can move on the display unit 15 of the display device 2.

In addition, the mouse cursor 20 is moved on each mode instruction button 16, 17, 18 and 19 which are provided on the display device 2 by operating the mouse cursor control mechanism 13 and pressing the mouse instruction button 14 located on the mouse 5. Therefore, the mode instructed by the mouse instruction button 14 is transmitted to the CPU 6 through the mouse control unit 12, and the CPU 6 executes the operation for the selected mode.

Figure 3:
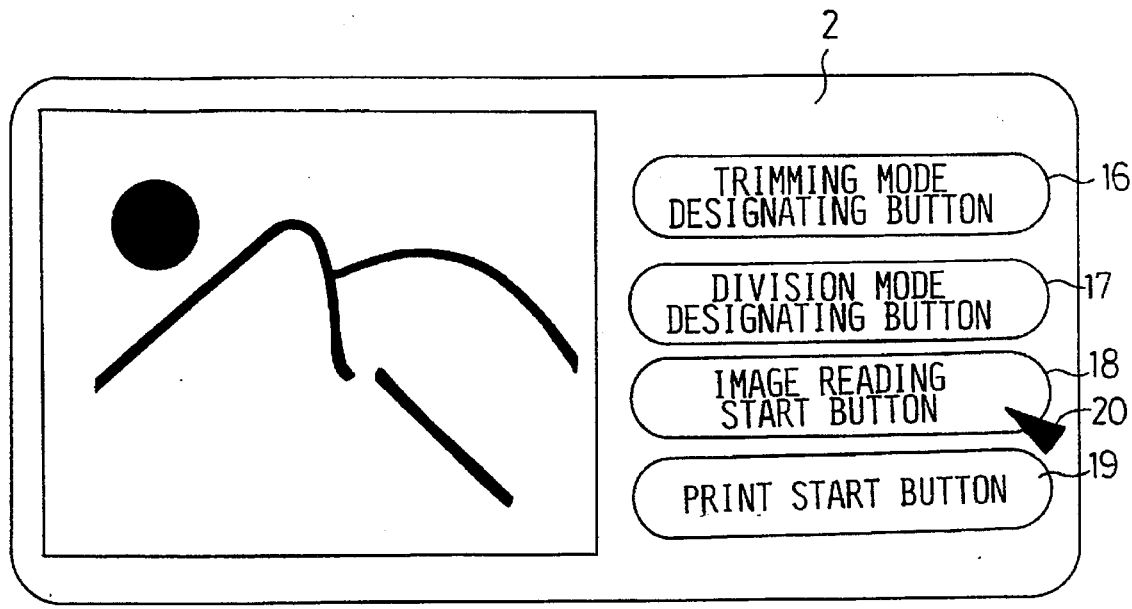
FIG. 3 is a schematic front view showing the display device displaying image data.

In operation during an actual processing procedure, first, image data is read into the control device 1 by the image reading device 3. That is, the mouse cursor 20 is moved on the image data reading start button 18 by operating the mouse cursor control mechanism 13, and the mouse instruction button 14 located on the mouse 5 is pressed. By this operation, the CPU 6 outputs the instruction for reading the image to the image reading device 3 through the image reading control unit 10, memorizes the read image data in the RAM 8, and displays it onto the display device 2 through the display control unit 9 as shown in FIG. 3.

Figure 6:
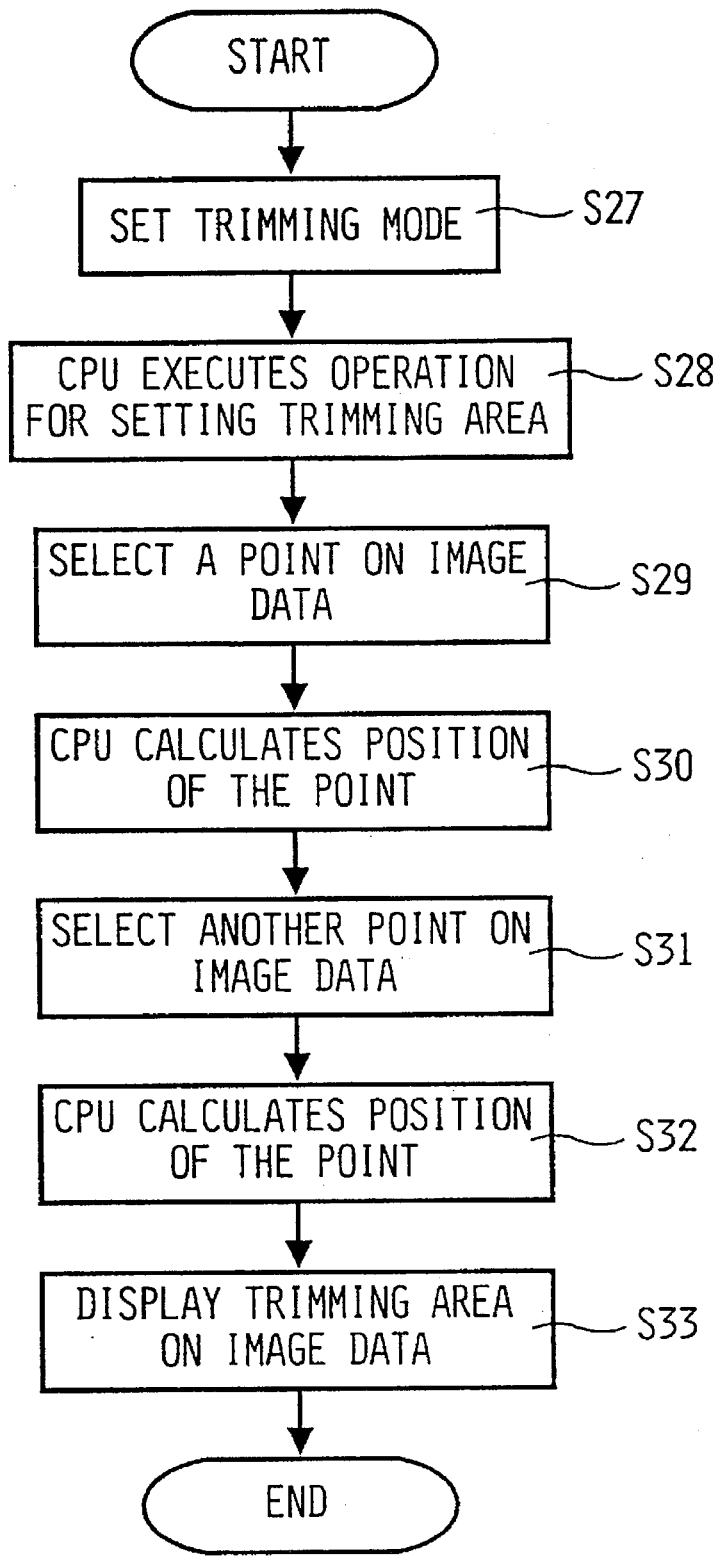
FIG. 6 is a flowchart showing the process of setting the trimming area of the image data.

The procedure for setting the trimmed area is explained with reference to FIG. 4 and FIG. 6. First, the mouse cursor 20 is moved onto the trimming mode designating button 16 which designates the mode for setting the trimmed area by operating the mouse cursor control mechanism 13 of the mouse 5, and then the mouse instruction button 14 located thereon is pressed (step S27). Then, the CPU 6 executes the operation for setting the trimmed area (step S28).

Figure 4:
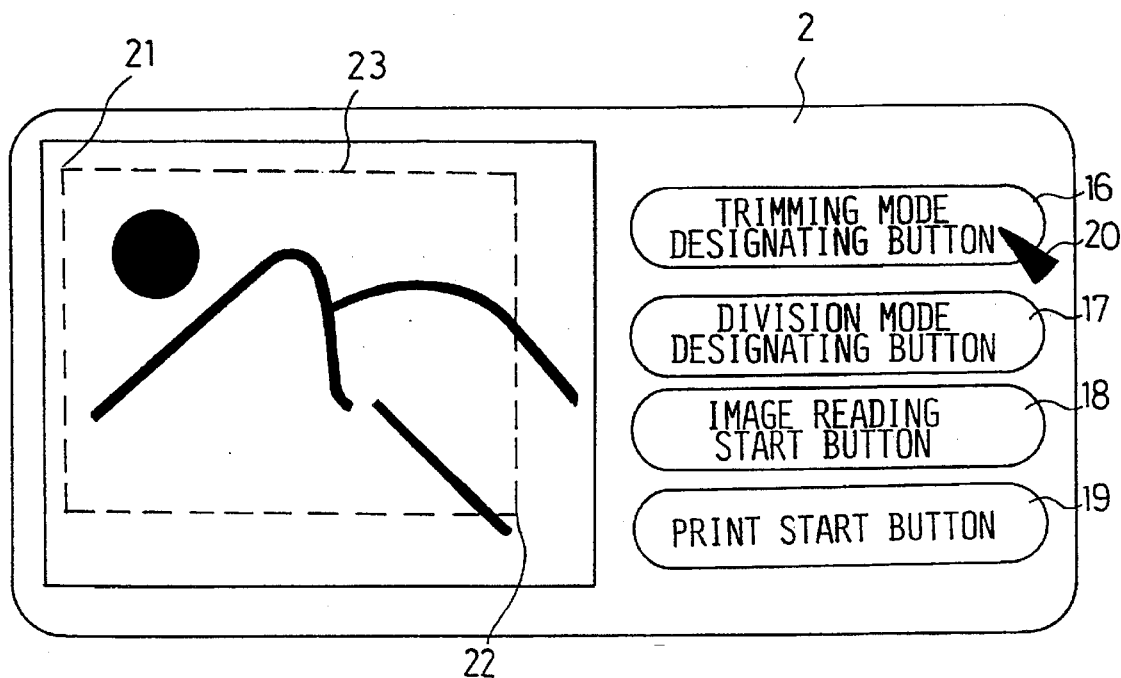
FIG. 4 is a schematic front view showing the display device displaying an area of the image data to be trimmed from FIG. 3.

Next, the mouse cursor 20 is moved onto a point 21 on the image data displayed on the display unit 15, as shown in FIG. 4, by operating the mouse cursor control mechanism 13 of the mouse 5. The mouse instruction button 14 located thereon is then pressed (step S29). As a result, the CPU 6 calculates coordinates of the point 21 displayed on the display unit 15 from the relation between the position which the mouse cursor 20 designates at that time, that is, the position of the point 21 and the whole position of the image data which is displayed on the display unit 15. The calculated coordinates are stored in the RAM 8 (step S30).

The mouse cursor 20 is then moved onto a point 22 which is in a diagonal position to the point 21 by operating the mouse cursor control mechanism 13 of the mouse 5, and the mouse instruction button 14 located thereon is pressed (step S31). At this time, the CPU 6 calculates coordinates of the point 22 displayed on the display unit 15 by the same method for calculating the coordinates of the point 21. The calculated coordinates are also stored in the RAM 8 (step S32). Then, a rectangle which has the point 21 and the point 22 as diagonal points is calculated in the CPU 6 and is displayed on the display unit 15 as a trimmed area 23 through the display control unit 9 of the control device 1 (step S33). The trimmed area 23 is shown in FIG. 4 as the dotted line rectangle.

Figure 7:
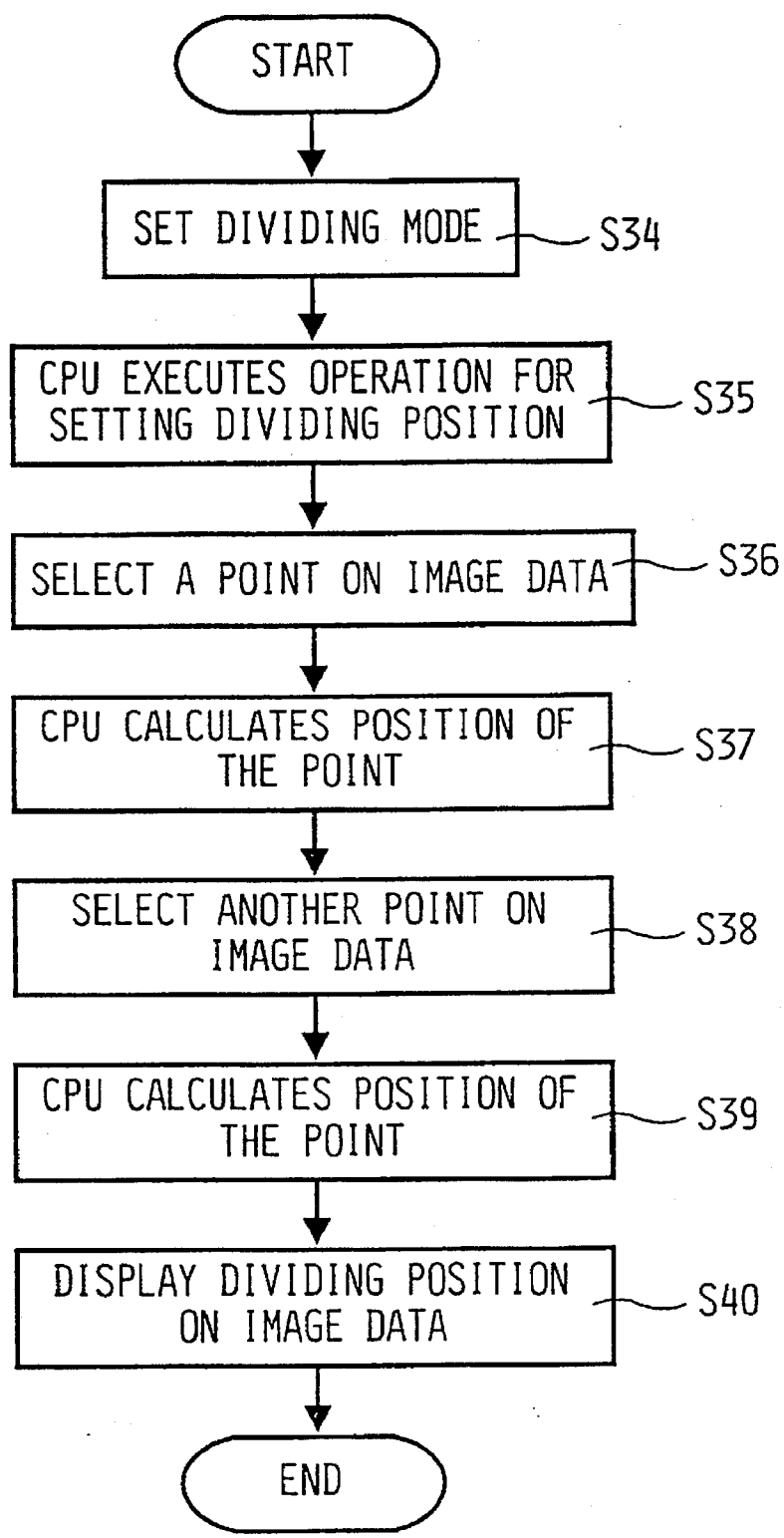
FIG. 7 is a flowchart showing the process of setting the dividing position of the image data.

The procedure for setting the dividing position is explained with reference to FIG. 5 and FIG. 7. First, the mouse cursor 20 is moved onto the division mode designating button 17 which designates the mode for setting the dividing position by operating the mouse cursor control mechanism 13 of the mouse 5, and the mouse instruction button 14 located thereon is pressed (step S34). Then, the CPU 6 executes the operation for setting the dividing line (step S35).

Figure 5:
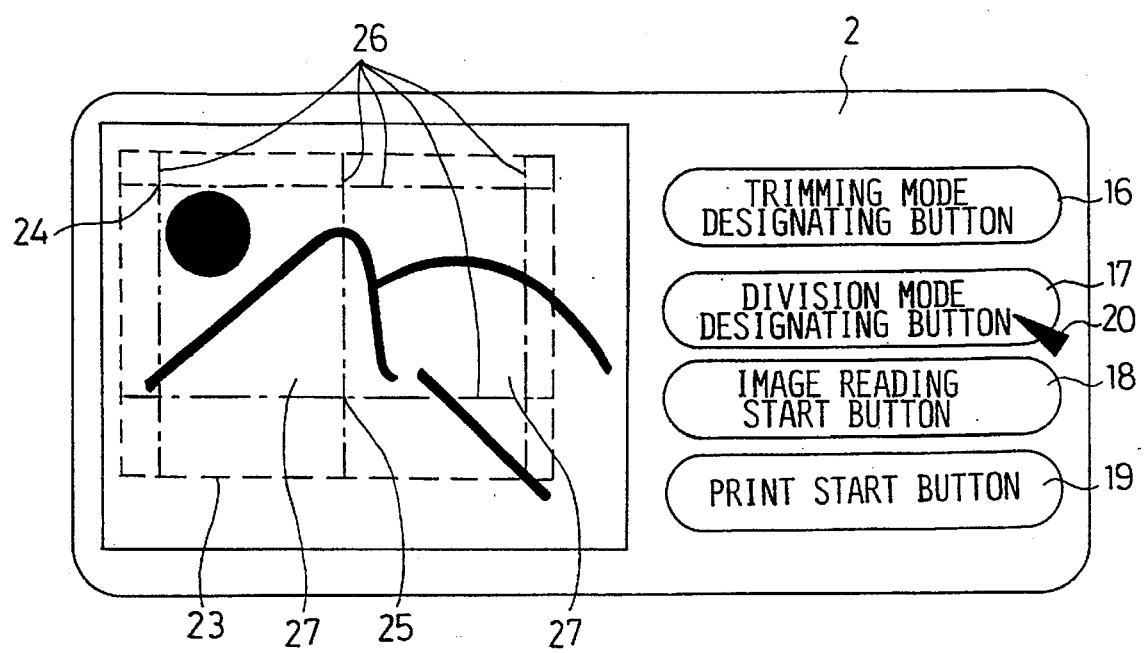
FIG. 5 is a schematic front view showing the display device displaying a position to be divided of the image data from FIG. 4.

Next, the mouse cursor 20 is moved onto a point 24 on the image data displayed on the display unit 15, as shown in FIG. 5, by operating the mouse cursor control mechanism 13 of the mouse 5, and the mouse instruction button 14 located thereon is pressed (step S36). As a result, the CPU 6 calculates coordinates of the point 24 displayed on the display unit 15 from the relation between the position which the mouse cursor 20 designates at that time, that is, the position of the point 24 and the whole position of the image data which is displayed on the display unit 15. The calculated coordinates are stored in the RAM 8 (step S37). The mouse cursor 20 is then moved onto a point 25 which is in a diagonal position to the point 24 by operating the mouse cursor control mechanism 13 of the mouse 5, and the mouse instruction button 14 located thereon is pressed (step S38). These points 24 and 25 are selected so that a dividing line extended from the points 24 and 25 should not pass through an important part of the image. At this time, the CPU 6 calculates coordinates of the point 25 displayed on the display unit 15 by the same method for calculating the coordinates of the point 24, and the calculated coordinates are also stored in the RAM 8 (step S39). Then, a plurality of dividing lines 26 which divide the trimmed area 23 into upper and lower and right and left portions are drawn based on the point 24, at intervals based on the horizontal distance and vertical distance between the points 24 and 25. The dividing lines 26 are displayed as seen in FIG. 5 with a dash-dot chain line on the display unit 15 through the display control unit 9 of the control device 1 (step S40). That is, a plurality of divided areas which have the same size as a divided area 27 based on the points 24 and 25 are automatically formed, in the right and left and upper and lower sides of the basic divided area. In FIG. 5, only two divided areas 27 are formed, but equivalent divided areas also can be formed on upper or lower sides if the image is larger than that shown in FIG. 5.

Figure 8:
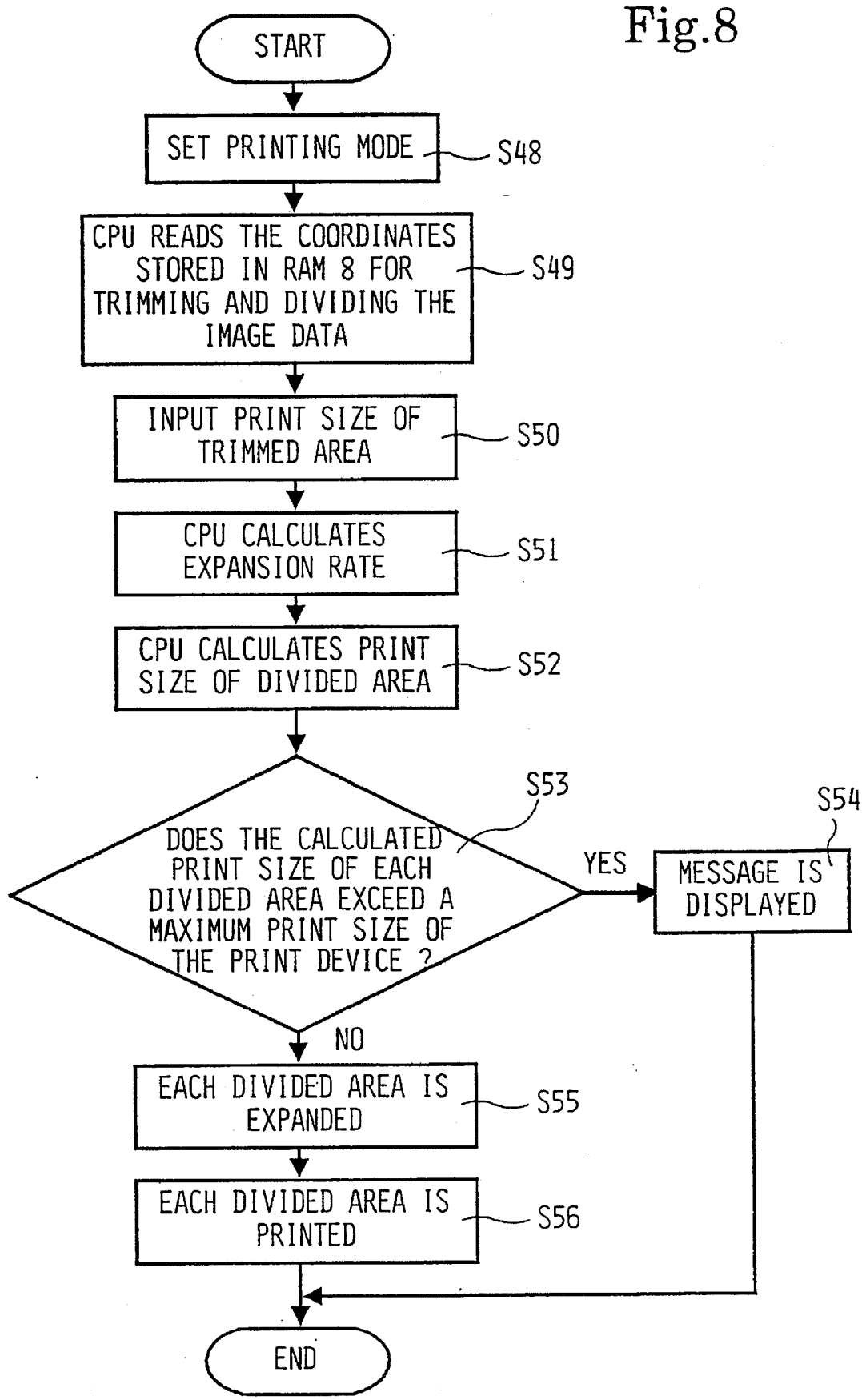
FIG. 8 is a flowchart showing the process of printing the image.

Next, the printing procedure is explained with reference to FIG. 8. First, the mouse cursor 20 is moved onto the print start button 19 for starting the print operation by operating the mouse cursor control mechanism 13, and the mouse instruction button 14 located on the mouse 5 is pressed (step S48). As a result, the CPU 6 reads the coordinates of points 21 and 22 stored in the RAM 8 and trims the image data based on those points. The CPU 6 also reads the coordinates of points 24 and 25 stored in the RAM 8 and divides the image data based on those points (step S49).

Next, the size, in length and breadth, of the trimmed area desired to be printed is input by a print size input means (not shown) (step S50). The CPU 6 calculates an expansion rate based on this input print size, the actual size of the trimmed area, and the resolution of the print device (step S51). The print size of the divided image data is calculated based on the expansion rate (step S52). Then, in step S53, it is determined whether or not the calculated print size of each divided image exceeds a maximum print size of the print device. When the calculated print size of each divided image exceeds a maximum print size of the print device (step S53: YES), a message which shows an excess of print size is displayed (step S54). In such a case, based on the flowchart for setting the dividing mode disclosed in FIG. 7, the coordinates of new points which divide the trimmed area such that the dividing line does not pass through an important part of the image are set again. When the calculated print size of each divided image does not exceed a maximum print size of the print device (step S53: NO), print data of each divided area is expanded by the expansion rate (step S55) and is transmitted to the print device 4 through the print control unit 11, and each divided area is printed in turn (step S56). The divided images printed and output from the print device 4 are manually adhered by the operator to form the complete image.

In addition, the divided image data can be expanded at an expansion rate arbitrarily set by the operator and printed out.

In this embodiment, the trimmed area 23 and the dividing lines 26 are designated by selecting the points on the image data displayed on the display unit 15 of the display device 2 by using the mouse 5. However, it is possible to numerically input the coordinates of the points for designating the trimmed area or the dividing position by using the keyboard.

Moreover, it is possible to use a tablet, a light pen or a keyboard instead of the mouse 5. Also, it is possible to realize a construction which adds an external memory device which stores the formed image data, the trimmed area and the dividing position. Further, another construction that adds a communication device which transmits the image data produced by an external computer etc. to the apparatus of the present embodiment is possible.

While advantageous embodiments have been chosen to illustrate the invention, it will be understood by those skilled in the art that various changes and modifications can be made therein without departing from the scope of the invention as defined in the appended claims.

What is claimed is:

1. An image processing apparatus, comprising:
   image reading means for providing image data, the image data being capable of being trimmed or divided;
   designating means for designating a trimmed area wherein a periphery of the image data is trimmed, and for designating a divided area within the trimmed area which divides the image data into a plurality of parts for printing;
   control means for controlling the designating means to permit a user to selectively determine the divided area by visual inspection;
   display means having a display unit for simultaneously displaying the image data, the trimmed area, and the divided area, the trimmed area and the divided area being superimposed on the displayed image data; and
   printing means for printing for printing processed image data as a plurality of segments based on the designated trimmed area and the divided area, wherein said control means automatically calculates a maximum expansion rate for printing a segment of the divided image data based on the divided area within a possible print size of said printing means.

2. The image processing apparatus according to claim 1, wherein the trimming area is arbitrarily set on the display unit.

3. The image processing apparatus according to claim 1, wherein the divided area is set on the display unit so that a boundary of the divided area does not pass through an important part of the image data.

4. The image processing apparatus according to claim 1, further comprising expansion input means for adjusting a print size of the image data, wherein said control means includes warning means for instructing said display means to display a message which shows that the calculated expansion rate exceeds the possible print size of the divided area by said printing means.

5. An image processing apparatus, comprising:
   input means for inputting image data;
   memory means for storing input image data;
   display means for displaying input image data;
   dividing location means for designating a base dividing location for dividing the image data;
   dividing means for dividing the image data using the base dividing location designated by the dividing location means into a plurality of image data parts, wherein said dividing location means comprises calculating means for calculating coordinates for a first point and a second point used to designate the base dividing location and generating means for generating base dividing lines extending from each point to form a first pair of parallel lines in a first direction and a second pair of parallel lines orthogonal to said first pair of parallel lines, an area enclosed by said first pair of parallel lines and said second pair of parallel lines defining a base image data part, and wherein said generating means automatically generates additional parallel dividing lines equally spaced from said first and second points to define additional image parts;
   print instructing means for instructing a print device to print each image data part on a different recording medium; and
   trimming means for trimming the image data around a periphery thereof prior to dividing the image data.

6. The image processing apparatus according to claim 5, wherein said trimming means comprises first trimming point selecting means for selecting a first trimming point in the image data, a second trimming point selecting means for selecting a second trimming point in the image data, and a trimming area generating means for generating a trimming area based on said first point and said second point.

7. The image processing apparatus according to claim 5, wherein said dividing location means comprises a mouse movable on said display means.

8. The image processing apparatus according to claim 5, further comprising expansion input means for selectively inputting an expansion size, wherein said print instructing means includes reading means for reading the dividing location in the image data, expansion rate calculating means for calculating an expansion rate for the divided image data, and determining means for determining whether a print size of the expanded divided image data of an image part can be printed by the print device on the recording medium.

9. The image processing apparatus according to claim 8, wherein said print instructing means further comprises expanding means for expanding the divided image data based on the calculated expansion rate and printing means for instructing the print device to print the expanded divided image data.

10. The image processing apparatus according to claim 8, further comprising warning means for generating a warning to display on said display means, based on the determination by said determining means, that the print size of the expanded divided image data of the image part cannot be printed by the print device on the recording medium.

11. An image processing apparatus, comprising:

image reading means for providing image data, the image data being capable of being trimmed or divided;

trimming area designating means for designating a trimming area for printing, said trimming area designating means including first selecting means for selecting two points on the image data to define the trimming area;

dividing position designating means for designating a dividing position which divides the image data into plural parts, said dividing position designating means including second selecting means for selecting two points in the designated trimming area;

calculating means for calculating coordinates of each of the points selected by said first selecting means and said second selecting means;

display means having a display unit for simultaneously displaying the image data, the trimming area, and the dividing position, the trimming area and the dividing position being superimposed on the displayed image data;

expansion size input means for inputting one of automatic expansion size setting based on a size of a recording medium and setting an expansion size;

printing means for printing image data divided based on the designated trimming area and dividing position; and expansion rate calculating means for expanding for printing the divided image data based on the input expansion size.

12. The image processing apparatus according to claim 11, wherein said display means includes warning means for displaying a message which shows that the calculated expansion rate exceeds the print size of said printing means based on the input expansion size.

* * * * *